United States Patent
D'Angelo

(10) Patent No.: US 7,179,073 B2
(45) Date of Patent: Feb. 20, 2007

(54) PRESSURE-REDUCING VALVE AND A CONTROLLER FOR A BLOW-MOLDING MACHINE AND METHOD THEREOF

(75) Inventor: Russell Phillip D'Angelo, Rock Creek, OH (US)

(73) Assignee: Davis-Standard, LLC, Pawcatuck, CT (US)

( * ) Notice: Subject to any disclaimer, the term of this patent is extended or adjusted under 35 U.S.C. 154(b) by 318 days.

(21) Appl. No.: 10/377,692

(22) Filed: Mar. 4, 2003

(65) Prior Publication Data

US 2004/0173924 A1  Sep. 9, 2004

(51) Int. Cl.
*B29C 49/78* (2006.01)

(52) U.S. Cl. ............... 425/146; 425/149; 425/162; 425/536; 264/40.5

(58) Field of Classification Search ........... 125/146, 125/149, 162, 536; 264/40.5
See application file for complete search history.

(56) References Cited

U.S. PATENT DOCUMENTS 3,883,280 A * 5/1975 Waltman et al. ............ 425/162
4,978,290 A   12/1990 Fukuhara
5,110,519 A * 5/1992 Daubenbuchel et al. .... 264/412
5,330,342 A   7/1994 Linss et al.
6,638,050 B2 * 10/2003 Bazzo et al. ................ 425/149
6,713,002 B2 * 3/2004 Kazmer et al. ............ 264/40.1

FOREIGN PATENT DOCUMENTS

| DE | 198 29 679 A1 | 1/2000 |
| EP | 0 445 774 A | 9/1991 |
| EP | 0 767 045 A | 4/1997 |

* cited by examiner

*Primary Examiner*—Suzanne E. McDowell
(74) *Attorney, Agent, or Firm*—Levy & Grandinetti

(57) ABSTRACT

The invention is a pressure reducing valve for reducing the pressure supplied to a head tooling hydraulic positioning valve and a controller for bypassing the pressure reducing valve in a blow-molding machine. A pressure-reducing valve and electrical controller are used to regulate the pressure of a cylinder that controls the position of a head tooling pin and die assembly in a blow-molding machine. The invention reduces pressure during all time intervals except during a "parison formation" interval of the cycle. The invention is also a process for regulating the pressure of a cylinder that controls the position of a head tooling pin and die assembly in a blow-molding machine and for bypassing the pressure reducing valve in a blow-molding machine.

6 Claims, 4 Drawing Sheets

PRESSURE-REDUCING VALVE AND A CONTROLLER FOR A BLOW-MOLDING MACHINE AND METHOD THEREOF

BACKGROUND OF THE INVENTION

1. Field of the Invention

The invention relates to a pressure-reducing valve and a controller for a blow-molding machine and method thereof. Specifically, the invention relates to a pressure reducing valve for reducing the pressure supplied to a head tooling hydraulic positioning valve and a controller for bypassing the pressure reducing valve in a blow-molding machine and method for regulating the pressure of a cylinder that controls the position of a head tooling pin and die assembly in a blow-molding machine.

2. Description of Related Art

A mandrel pin and a die arrangement, commonly referred to as a head tooling, are used in an extrusion blow-molding process to form a molten tube of plastic called a "parison." The parison is extruded from an extrusion head into a hollow mold that is in the shape of the desired product. Once the parison is captured by the mold, the mandrel pin and the die are closed to prevent excess plastic from flowing from the extrusion head. Air is then injected into the captured parison causing the parison to conform to the shape of the hollow mold. After sufficient cooling time, the mold is opened and a formed piece of plastic is removed.

An inner diameter of the die and an outer diameter of the mandrel pin determine the desired size and shape of the parison that is to be produced by the blow-molding machine. Adjusting a die gap opening or clearance between the mandrel pin and the die varies a wall thickness of the finished part. A hydraulic cylinder is coupled to the mandrel pin or the die tooling and is used to adjust the die gap opening between the mandrel pin and the die. The cylinder that controls this movement is generally called a programming cylinder.

The programming cylinder must have sufficient force to precisely adjust the die gap opening of the mandrel pin and the die during the extrusion of the parison. Depending on the chosen machine controller and parts to be produced, the die gap opening can be adjusted in excess of 100 times during the formation of the parison. To provide a rapid and a precise movement of the mandrel pin and the die against the flow of parison, a hydraulic pressure of at least 2,000 psi is often required by the programming cylinder.

Several products of differing sizes and shapes are produced by blow-molding machines and often require the use of several varieties of the pin and die toolings. A machine "setup technician" must manually calibrate the die gap opening of the mandrel pin and the die for each new pin and die tooling. The calibration can be performed electrically by adjusting a position of the programming cylinder. If this adjustment is not carefully preformed, the mandrel pin and the die can come into contact with each other. If contact occurs between the mandrel pin and the die, the high hydraulic pressure at the programming cylinder can damage the mandrel pin, the die, and/or other extrusion head components.

The industry lacks an accurate and safe apparatus and method for preventing accidental contact between and damage of the mandrel pin and the die tooling that is caused by an inaccurate calibration of the position of the programming cylinder in a blow-molding machine.

BRIEF SUMMARY OF THE INVENTION

The invention relates to a pressure reducing valve for reducing the pressure supplied to a head tooling hydraulic positioning valve and a controller for bypassing the pressure reducing valve in a blow-molding machine. A pressure-reducing valve and electrical controller are used to regulate the pressure of a cylinder that controls the position of a head tooling pin and die assembly in a blow-molding machine. The invention reduces pressure during all time intervals except during a "parison formation" interval of the cycle.

The invention is also a process for regulating the pressure of a cylinder that controls the position of a head tooling pin and die assembly in a blow-molding machine and for bypassing the pressure reducing valve in a blow-molding machine. The process for regulating the pressure of a cylinder, that controls the position of a head tooling pin and die assembly in a blow-molding machine and for bypassing the pressure reducing valve in a blow-molding machine, can include the following steps. Extruding a plastic resin and supplying the melted resin into an accumulator head assembly is performed. Accumulating a pre-defined amount of plastic resin in a material accumulation area then occurs. Injecting the melted resin through a pin and die assembly forms a parison in a mold, such as between two hollow mold halves. Then, allowing the pressure supplied to the programming cylinder during the step of forming parison to be high is performed while reducing the pressure supplied to the programming cylinder is performed at all other times.

DETAILED DESCRIPTION OF THE INVENTION

Figure 1:
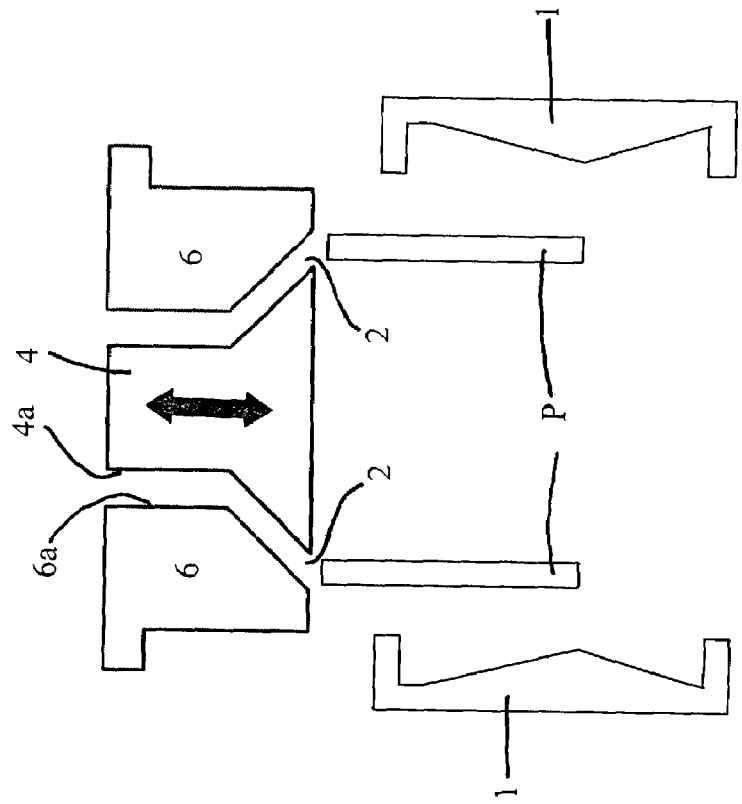
FIG. 1 illustrates a die gap opening between a mandrel pin and die tooling assembly in a blow-molding machine.
Figure 1:
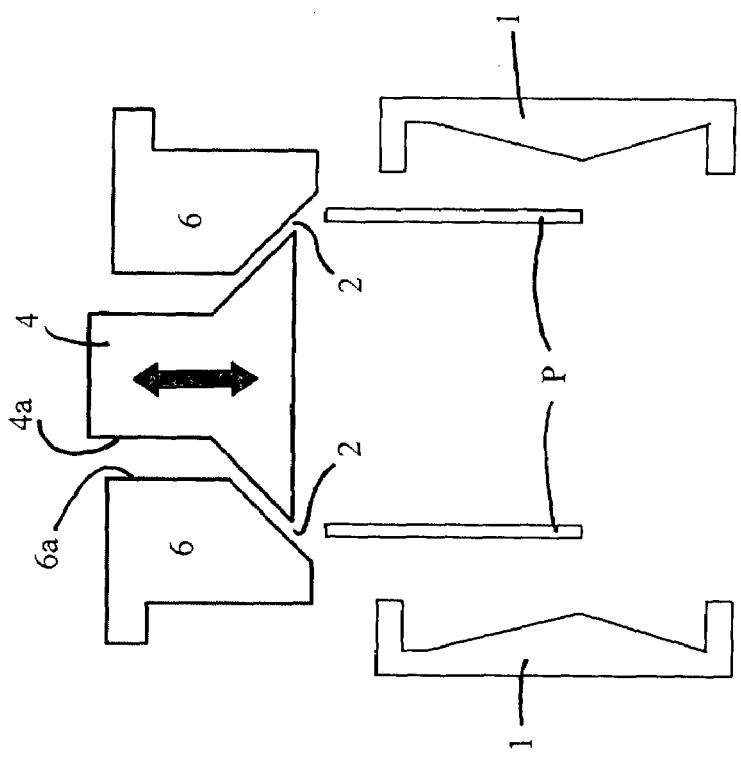

The invention relates to a pressure reducing valve for reducing the pressure supplied to a head tooling hydraulic positioning valve and a controller for bypassing the pressure reducing valve in a blow-molding machine. A pressure-reducing valve and electrical controller are used to regulate the pressure of a cylinder that controls the position of a head tooling pin and die assembly in a blow-molding machine. The invention is designed such that the pressure is reduced during all time intervals except during a "parison formation" interval of the cycle. This invention greatly reduces the chance of damage to the machine head components due to improper positioning of the mandrel pin and die due to operator error, mechanical electrical error, or hydraulic component failure.

The invention provides a pressure reducing valve for reducing the pressure supplied to a head tooling hydraulic positioning valve and a controller for bypassing the pressure reducing valve in a blow-molding machine and method for regulating the pressure of a cylinder that controls the position of a head tooling pin and die assembly in a blow-molding machine. The invention reduces the pressure of the programming cylinder at all times except during the actual flow of plastic from the extrusion head to form the parison. Therefore, if the mandrel pin and die are not properly adjusted and an accidental contact occurs, the invention will prevent the possibility of damage because the pressure of the programming cylinder is reduced.

The invention also relates to a process for regulating the pressure of a cylinder that controls the position of a head tooling pin and die assembly in a blow-molding machine and for bypassing the pressure reducing valve in a blow-molding machine.

Blow-molding machines are used to produce a wide variety of products such as milk bottles, trash cans, the backs of an automobile seats, and 55 gallon drums. During a blow-molding process, plastic pellets are inserted into the extruder of a blow-molding machine and processes under high temperature and pressure by a screw in the extruder barrel. The extruder melts and feeds a plastic resin to an accumulator head.

The machine head components of a blow-molding machine can include a variety of distinct apparatuses. Typically, the machine head components include a pin and die assembly, a material accumulation area, a shooting plunger, a core tube, a program extension rod, push-out cylinders, a programmer hydraulic valve, and a programming cylinder.

The plastic resin pellets are inserted into the extruder of the blow-molding machine and processed by a screw in its barrel. The extruder melts the plastic pellets and conveys the melted plastic to the accumulator head of the machine. The melted plastic accumulates in the material accumulation area of the accumulator head. Once the accumulator is filled to the proper level, and the melted plastic is injected from the accumulator head through the pin and die assembly. The pin and die assembly controls the wall thickness of the parison.

Hollow molds are attached under the accumulator head. The parison is held in the mold for a sufficient amount of time to solidify. The molds are opened once the parison is cooled and the parison is expelled from the molds. Typically, a plurality of molds are filled by an accumulator head.

The head tooling pin and die assembly in a blow-molding machine include a mandrel pin and a die. The parison is pushed through the pin and die assembly out through a die gap opening during the parison formation process. The inner diameter of the die and the outer diameter of the pin determine the size and shape of the parison tube formation. The programming cylinder adjusts the die gap opening by moving the die or the pin up or down in relation with each other through use of a hydraulic cylinder. The thickness of the parison tube is dependent upon the pressure and temperature of the plastic resin, the composition of the plastic resin, and the relative position of the pin to the die. A frequent re-calibration of the pin and die tooling can become expensive, cause damage, downtime for repairs, and a loss of production.

The parison formation interval during a blow-molding process occurs from the moment the accumulator head injects the plastic resin to the moment the parison is enclosed by the hollow molds. The parison is formed under a high pressure, solidifies in the molds, dropped out of the molds, and then is trimmed. The desired characteristics of the final parison can dictate the time cycle of injection, as well as the space between the pin and the die.

A pressure-reducing valve and an electric control circuit can include a plurality of components. Typically, such components include a head tooling hydraulic positioning valve, a pressure-reducing directional element, a pressure-reducing element, pilot-operated logic elements, a programmer cylinder circuit, and pressure gauge ports. The head tooling hydraulic positioning valve is controlled by user-constructed, position steps that are programmed into a microprocessor. The pressure-reducing valve directional element disables the pressure reducing valve and allows full pressure to pass through the reducing element of the pressure-reducing valve or "pressure-reducing valve reducing element." The pressure-reducing valve reducing element decreases or reduces the pressure supplied to the head tooling hydraulic positioning valve at all times except during the parison formation interval. The pilot-operated logic elements respond to a signal from the hydraulic circuit and allow oil to be available to a hydraulic circuit. The programmer cylinder circuit varies the die gap opening of the blow-molding machine by raising and lowering the pin and die tooling assembly. Pressure gauge ports can be provided for measuring the pressure of the machine components during the blow-molding process.

The pressure-reducing valve directional element is an electrically controlled valve that energizes the pressure reducing circuit. The pressure reducing valve directional element operates under one of two conditions. The first condition occurs when the pressure reducing valve directional element is energized during the parison formation interval of the blow-molding process and bypasses the pressure-reducing valve reducing element. The second condition occurs when the pressure reducing valve directional element is not energized during the parison formation interval. The pressure-reducing valve directional element then allows full pressure to flow through the head tooling hydraulic positioning valve and on to the programmer cylinder circuit so the desired parison can be properly formed. The head tooling hydraulic positioning valve controls the programmer cylinder that is coupled to the pin and die tooling assembly and varies the die gap opening of the blow-molding machine.

The head tooling hydraulic positioning valve responds to a pre-defined series of events from the microprocessor and raises or lowers the programming cylinder to adjust the plastic flow through the pin and die assembly. The pilot-operated logic elements respond to a signal from another section of the hydraulic circuit that communicates to the pilot-operated logic elements that the hydraulic oil should be available to the programming cylinder. A purpose of the pilot-operated logic elements is to disable the programming cylinder movement until the blow-molding machine reaches its proper working heat.

The process for regulating the pressure of a cylinder that controls the position of a head tooling pin and die assembly in a blow-molding machine and for bypassing the pressure reducing valve in a blow-molding machine can include the following steps. Extruding a plastic resin and supplying the melted resin into an accumulator head assembly is performed. Accumulating a pre-defined amount of plastic resin in a material accumulation area then occurs. Injecting the melted resin through a pin and die assembly forms a parison in a mold, such as between two hollow mold halves. Then, allowing the pressure supplied to the programming cylinder during the step of forming parision to be high is performed while reducing the pressure supplied to the programming cylinder is performed at all other times.

The step of allowing the pressure supplied to the programming cylinder to be high during the parison formation time interval desirably includes the step of allowing pressure to pass directly to the head tooling hydraulic positioning valve by electrically bypassing the pressure-reducing valve through use of an electric control circuit. The electric control circuit can include a pressure-reducing valve directional element that by-passes the pressure-reducing valve reducing element.

The step of reducing the pressure supplied to the programming cylinder at all other times includes the step of directing the pressure supplied to the head tooling hydraulic positioning valve to be first directed through a pressure-reducing valve reducing element through use of an electric control circuit. The electric control circuit can include a pressure-reducing valve directional element.

FIG. 1 illustrates a die gap opening between a mandrel pin and die tooling assembly in a blow-molding machine. An inner diameter 6a of a die 6 and an outer diameter 4a of a mandrel pin 4 determine the desired size and shape of the parison that is to be produced by the blow-molding machine. Adjusting a die gap opening or clearance 2 between the mandrel pin 4 and the die 6 varies a wall thickness of the finished part. A hydraulic cylinder (not shown) is coupled to the mandrel pin 4 or the die 6 tooling assembly and is used to generally adjust the die gap opening 2 between the mandrel pin 4 and the die 6. The means for controlling the pin and die gap is desirably a cylinder. The cylinder controls the movement of the pin 4 in relation to the die 6 and is generally called a "programming cylinder."

The programming cylinder must have sufficient force to precisely adjust the die gap opening 2 of the mandrel pin 4 and the die 6 during the extrusion of the parison P. The die gap opening 2 might be adjusted in excess of 100 times during the formation of the parison P. The amount of adjustment of the die gap opening depends on such factors as the chosen machine controller and the size and shape of the desired parts to be produced. A hydraulic pressure of at least 2,000 psi is often required by the programming cylinder to provide a rapid and a precise movement of the mandrel pin 4 and the die 6 against the flow of parison P.

The hollow mold halves 1 enclose and capture the parison tube P as the parison tube P is pushed from the die gap opening 2. Air is then blown into the hollow mold halves and the parison P is forced against the walls of the hollow molds 1. The hollow molds 1 are opened and the parison P is removed from the molds once the parison P is sufficiently cooled and hardened. Excess parison P is then trimmed to form a final product.

Several products of differing sizes and shapes are produced by such blow-molding machines and often require the use of several varieties of the pin and die tooling assemblies. A machine setup technician must manually calibrate the die gap opening 2 of the mandrel pin 4 and the die 6 for each new pin and die tooling assembly. The calibration of the die gap opening 2 can be performed electrically by adjusting a position of the programming cylinder. If this adjustment is not carefully preformed, the mandrel pin 4 and the die 6 can come into contact with each other. If contact occurs between the mandrel pin 4 and the die 6, the high hydraulic pressure at the programming cylinder can damage the mandrel pin 4, the die 6, and/or other extrusion head components.

The invention relates to a pressure reducing valve for reducing the pressure supplied to a head tooling hydraulic positioning valve and a controller for bypassing the pressure reducing valve in a blow-molding machine. A pressure-reducing valve and electrical controller are used to regulate the pressure of a cylinder that controls the position of a head tooling pin and die assembly in a blow-molding machine. Preferred embodiments of the invention reduce pressure during all time intervals except during a "parison formation" interval of the cycle. This embodiment greatly reduces the chance of damage to the machine head components due to improper positioning of the mandrel pin 4 and the die 6 due to operator error, mechanical electrical error, or hydraulic component failure.

Figure 2:
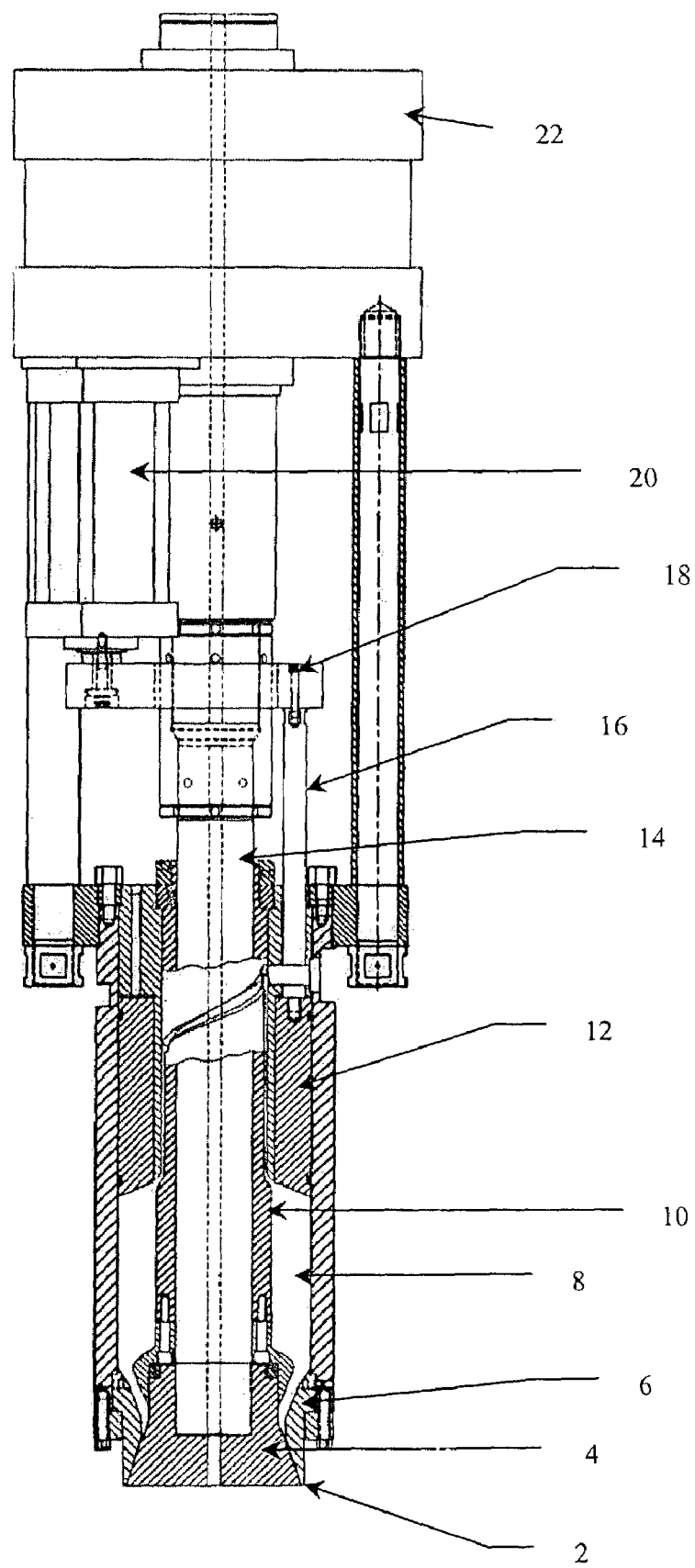
FIG. 2 illustrates an accumulator head in a blow-molding machine.

FIG. 2 illustrates an accumulator head in a blow molding machine. An extruder (not shown) melts plastic resin pellets and conveys or feeds the plastic resin into an accumulator head 100 of the blow-molding machine. The plastic resin is accumulated around a core tube 10 of the accumulator head 100 between the top of the die 6 and the bottom of a shooting plunger 12. A push-out cylinder 20 extends and moves a push-out plate 18 downward during parison (plastic tube) formation of the plastic resin. A programming cylinder 22 is coupled to the mandrel pin 4 by a program extension rod 14. The parison is propelled from the die gap opening 2 of the accumulator head 100 on demand through use of a mandrel pin 4 and a die 6.

The hollow tube of parison is propelled into hollow mold halves (not shown). Air is then injected into the parison. The parison is pushed against the mold walls to create a hollow part. A thickness of the plastic is controlled by the raising and lowering of either the mandrel pin 4 or the die 6, depending on the style extrusion head, to change the annular opening of the die gap opening 2 between the mandrel pin 4 and the die 6.

The programming cylinder 22, depending on the embodiment of the invention, can perform an oscillating or a simple up-and-down movement of the mandrel pin 4 and the die 6. Alternatively, the programming cylinder 22 can perform control movements as the liquid plastic is forced from the die gap opening 2 and into the hollow molds. These control movements increase and decrease the thickness of the parison as required by conditions of the plastic and the requirements for the desired molded object. A programming hydraulic valve (not shown) controls the programming cylinder and moves the mandrel pin 4 and the die 6 in relation to each other to change a width of the die gap opening 2. The varying of the width of the die gap opening 2 changes the thickness of the plastic parison as it is expelled.

One of the difficulties in the blow-molding process is overcoming the effects of the force of the plastic against the mandrel pin 4 and the die 6. If the parison is rapidly expelled, the parison is thick and generates significant force on the machine part that is moving. Therefore, a substantial amount of hydraulic force is required to overcome the pressure of the parison that is forced through the die gap opening 2. Once a parison formation extrusion cycle has completed, the mandrel pin 4 and the die 6 tooling assembly must be closed to prevent unwanted secretion of the parison from the accumulator head 100 while the accumulator head 100 is filled with plastic for the next cycle. The mandrel pin 4 and the die 6 tooling assembly is usually sealed at a distance between seven to ten thousandths of an inch, depending on the type of machine, the machine operator's preferences, and the type of plastic used. With such a close clearance, a calibration mistake can easily pull the mandrel pin 4 against the die 6, or the die 6 against the mandrel pin 4. This condition creates significant damage to the blow-molding machine. Such damage can include an enlargement of the die, a breaking of bolts, or the breaking of top of the extrusion head. This damage further causes lost production.

This invention recognizes that high operating pressure is required by the programming cylinder 22 only during time intervals where the parison is being extruded from the accumulator head 100. The time duration of the parison formation extrusion cycle varies with the items being molded. It is common to expel 15 pounds of plastic in about six seconds for each parison formation extrusion cycle. The invention reduces the force of pressure supplied by the programming cylinder 22 at all remaining time intervals by use of a hydraulic circuit as illustrated in FIG. 3 that controls that the mandrel pin 4 and the die 6 movement.

Figure 3:
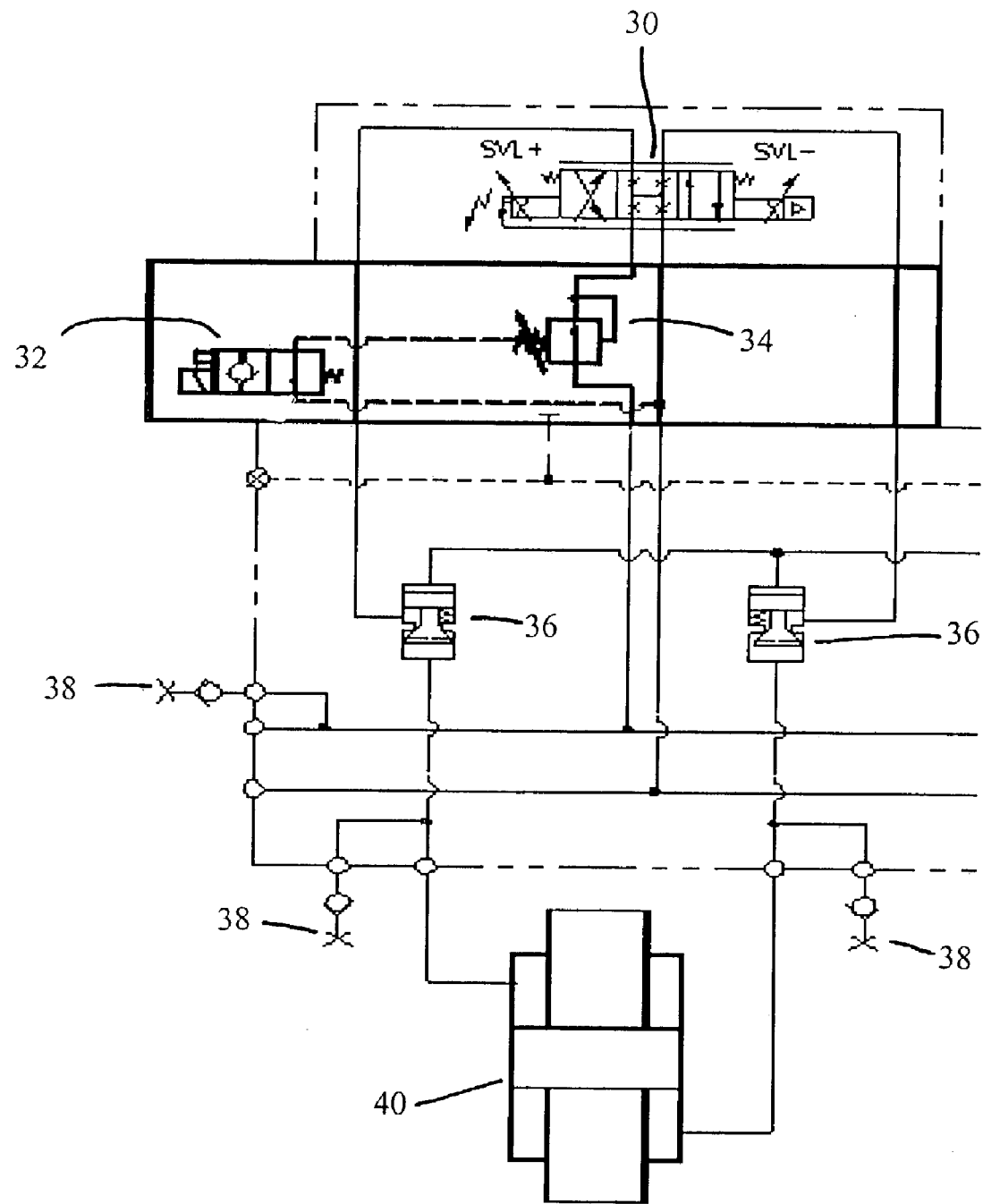
FIG. 3 illustrates a blow-molding machine hydraulic circuit with a controller directing a flow of pressure through a head tooling hydraulic positioning valve and a pressure reducing valve in a blow-molding machine in accordance with the invention.

FIG. 3 illustrates a blow-molding machine hydraulic circuit with a controller directing a flow of pressure through a head tooling hydraulic positioning valve and a pressure reducing valve in a blow-molding machine in accordance with the preferred embodiment of the invention. The blow-molding machine hydraulic circuit includes a plurality of components. Such components can include a head tolling hydraulic positioning valve 30, a pressure-reducing valve directional element 32, a pressure-reducing valve reducing element 34, at least one pilot-operated logic element 36, a plurality of pressure gauge ports 38, and a programmer cylinder circuit 40.

The head tolling hydraulic positioning valve 30 of the machine hydraulic circuit illustrated in FIG. 3 controls a programming cylinder that is coupled to a pin and die tooling assembly and varies a die gap opening of the blow-molding accumulator head. The head tooling positioning valve 30 responds to a pre-defined series of events from the microprocessor and raises and lowers the programming cylinder to adjust the plastic flow through the pin and die tooling assembly.

The pressure-reducing valve directional element 32 is an electrically controlled valve that energizes the pressure-reducing circuit. The pressure-reducing valve directional element 32 allows full pressure to flow through the head tooling hydraulic positioning valve 30 and on to the programmer cylinder circuit 40 during a parison formation extrusion cycle so that a desired parison can be properly formed. The pressure-reducing valve directional element 32 by-passes the pressure-reducing valve reducing element 34 during the parison formation extrusion cycle. The pressure-reducing valve directional element 32 directs the flow of pressure through the pressure-reducing valve reducing element 34 during all other times so that the pressure supplied to the head tooling hydraulic positioning valve 30 is reduced when the programming cylinder is not needed to form a parison.

An embodiment of the invention can include an electric control circuit that is separate from a pressure-reducing valve. An additional embodiment of the invention can include a combination of a pressure-reducing directional element that is in combination with a pressure-reducing reducing element. Such a combination can be assembled from commercially available components. The preferred embodiment uses a "Sun Pilot Operated Pressure Reducing/ Relieving Valve with External Drain. " This device is commercially available as a Sun model PVDA-LAN or PVFA-LAN.

The pressure-reducing valve reducing element 34 reduces the amount of pressure supplied to the head tooling hydraulic positioning valve 30. The pressure-reducing valve reducing element is energized at all times other than during the parison formation extrusion interval so that the pressure supplied to the programming cylinder is low when the accumulator head is waiting to be filling with plastic parison. The low pressure prevents damage to the pin and die tooling assembly that may occur as a result of mis-calibration or mis-alignment of the accumulator head. Such possible damage as an enlargement of the die, a breaking of bolts, or the breaking of top of the extrusion head.

The pilot-operated logic elements 36 respond to a signal from another part of the hydraulic circuit that communicates to the pilot-operated logic elements 36 that hydraulic oil should be available to the programming cylinder. The purpose of the pilot-operated logic elements 36 is to disable movement of the programming cylinder until the blow-molding machine has reached a proper working temperature. When the machine has reached a proper working temperature, a directional valve allows hydraulic oil to flow through the pilot-operated logic elements 36, which opens hydraulic oil flow to the cylinders.

The preferred embodiment of the invention includes additional components. For example, a plurality of pressure gauge ports 38 provide an opportunity for the pressure to be monitored and measured throughout the blow-molding machine during the entire blow-molding process. A programmer cylinder circuit or head tooling positioning cylinder 40 moves or "raises and lowers" the pin and die tooling assembly to change the die gap opening.

Figure 4:
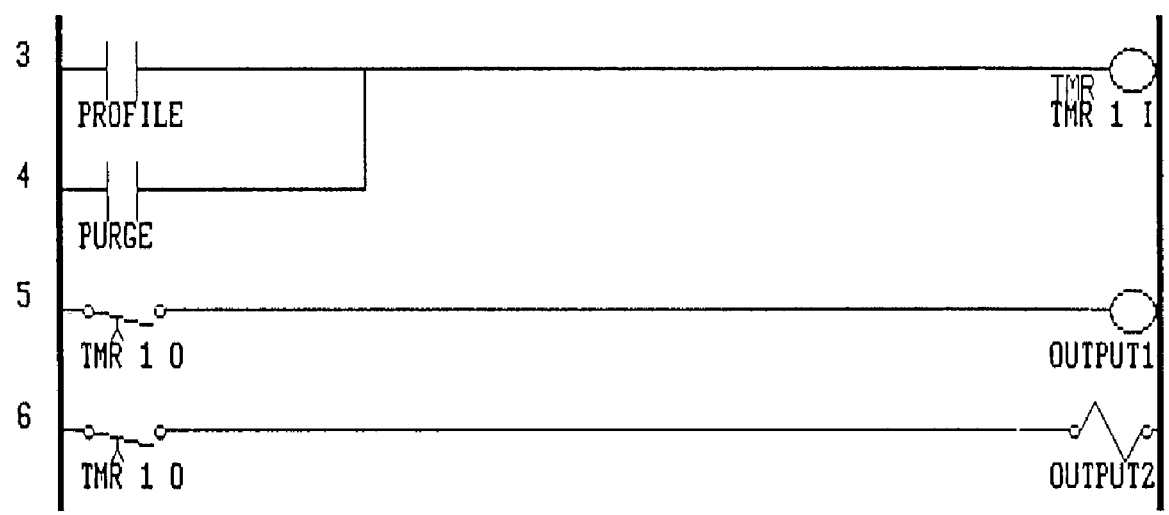
FIG. 4 illustrates an electrical logic circuit for the electric controller of the invention.

FIG. 4 illustrates an electrical logic circuit of the blow-molding process. The PROFILE and/or PURGE command go high when the accumulator head opens and allows the plastic resin to extrude from the accumulator head. The microprocessor simultaneously sends a series of pre-defined events to the head tooling positioning valve via a microprocessor. The energizing of the PROFILE and/or PURGE signal commands the blow-molding machine to begin the parison formation extrusion cycle, TMR 1I. The parison formation extrusion cycle is delayed by TMR 1I. The TMR 1O goes high at the start of the parison formation extrusion cycle and a signal is sent to the pressure-reducing valve directional element 32 shown in FIG. 3. The pressure-reducing valve directional element bypasses the pressure-reducing valve and allows full pressure to be supplied to the head tooling positioning valve. The head tooling hydraulic positioning valve passes by pressure to the programmer cylinder circuit which controls the movement to the pin and die assembly. When the parison formation extrusion cycle ends, the TMR 1I goes low and the TMR 1O goes low, ending with high pressure.

In view of the many changes and modifications that can be made without departing from principles underlying the invention, reference should be made to the appended claims for an understanding of the scope of the protection to be afforded the invention.

What is claimed is:

1. A controller for bypassing a pressure reducing valve in a blow-molding machine, comprising:
   a programmable cylinder, said programmable cylinder is operated by a fluid pressure and adjusts a relative position of a pin to a die;
   said pressure reducing valve, said pressure reducing valve controls said fluid pressure;
   an electrical circuit coupled to said pressure reducing valve, said electrical circuit regulates a cylinder pressure applied by said programmable cylinder to control said relative position of said pin to said die, said cylinder pressure is reduced during all time intervals except during a parison formation interval of a blow molding cycle,
   a microprocessor, said microprocessor regulates said cylinder pressure by said electrical circuit to apply said programmable cylinder to said relative position of said pin to said die by
      a profile/purge command, said profile/purge command initiates when an accumulator head opens to allow material to extrude from said accumulator head causing said microprocessor to transmit a series of pre-defined events to a head tooling positioning valve, said head tooling positioning valve signals said blow-molding machine to begin said parison formation interval, said parison formation interval signals a pressure reducing valve directional element to bypass said pressure reducing valve and allow full pressure to be supplied to said head tooling positioning valve, said head tooling positioning valve passes by pressure to a programmer cylinder circuit, said programmer cylinder controls movement to said pin and die assembly.

2. The controller of claim 1 wherein said programmable cylinder moves said pin in relation to said die.

3. The controller of claim 2, further comprising: said pressure reducing valve directional element that is energized during said parison formation interval of said blow-molding cycle and bypasses said pressure-reducing valve reducing element.

4. The controller of claim 1 wherein said programmable cylinder moves said die in relation to said pin.

5. The controller of claim 1 wherein said programmable cylinder moves said pin and said die independently.

6. The controller of claim 1, further comprising: said pressure reducing valve directional element that operates under one of two conditions, a first condition wherein said pressure reducing valve directional element is energized during said parison formation interval of said blow-molding cycle and bypasses said pressure-reducing valve reducing element and a second condition wherein said pressure reducing valve directional element is not energized during said parison formation interval.

* * * * *